H. A. DOUGLAS.
INTERNAL COMBUSTION ENGINE.
APPLICATION FILED DEC. 30, 1919.
1,407,519.
Patented Feb. 21, 1922.
2 SHEETS—SHEET 1.
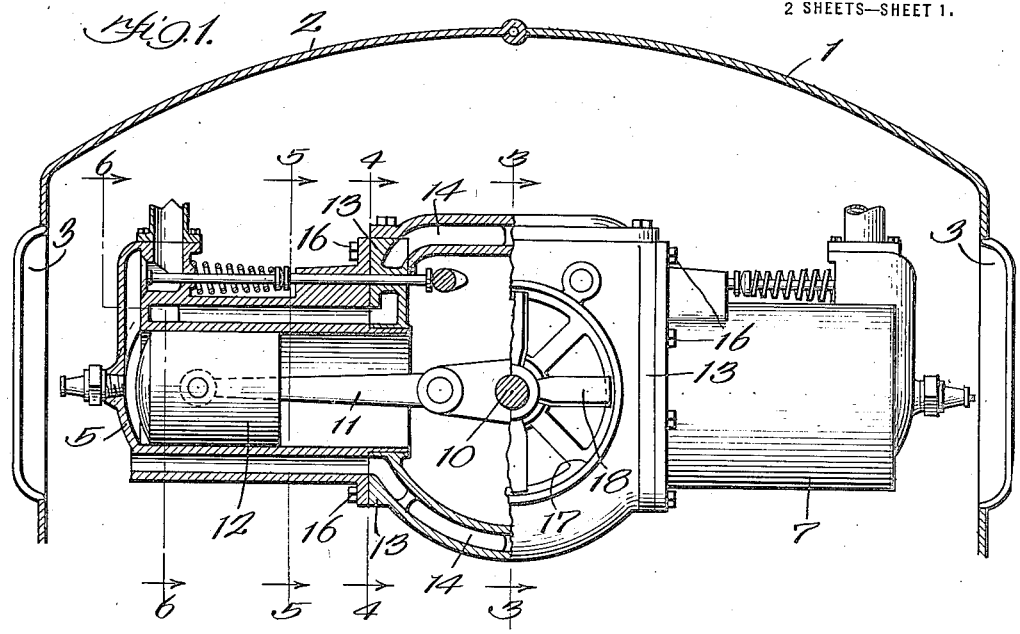
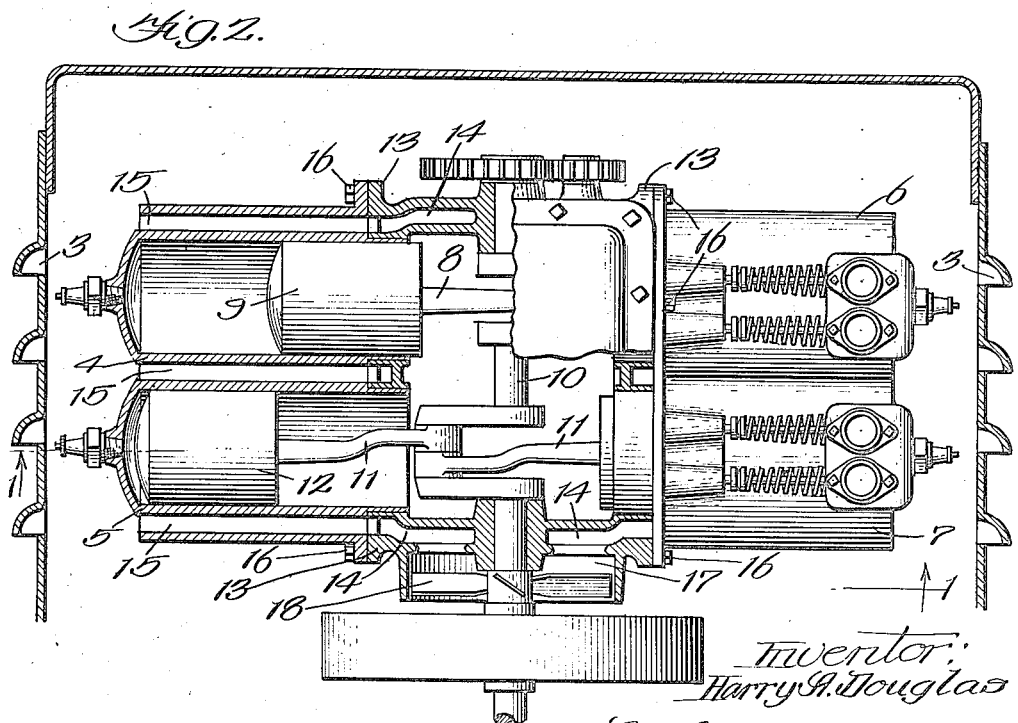
Inventor:
Harry A. Douglas
By G. L. Gragg, Atty.

H. A. DOUGLAS.
INTERNAL COMBUSTION ENGINE.
APPLICATION FILED DEC. 30, 1919.
1,407,519.
Patented Feb. 21, 1922.
2 SHEETS—SHEET 2.
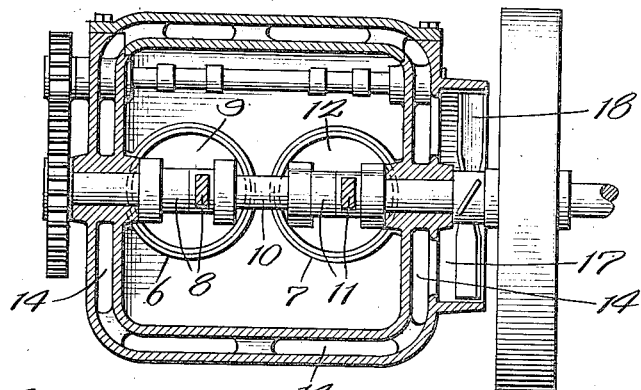
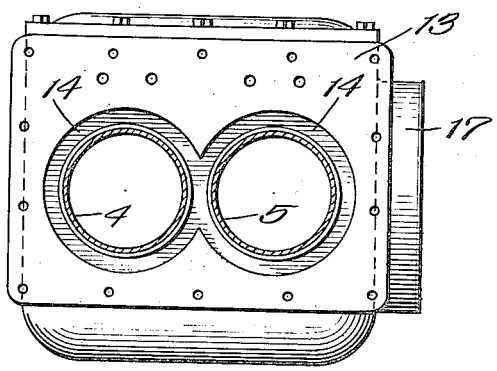
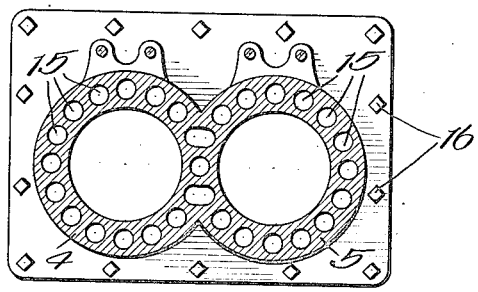
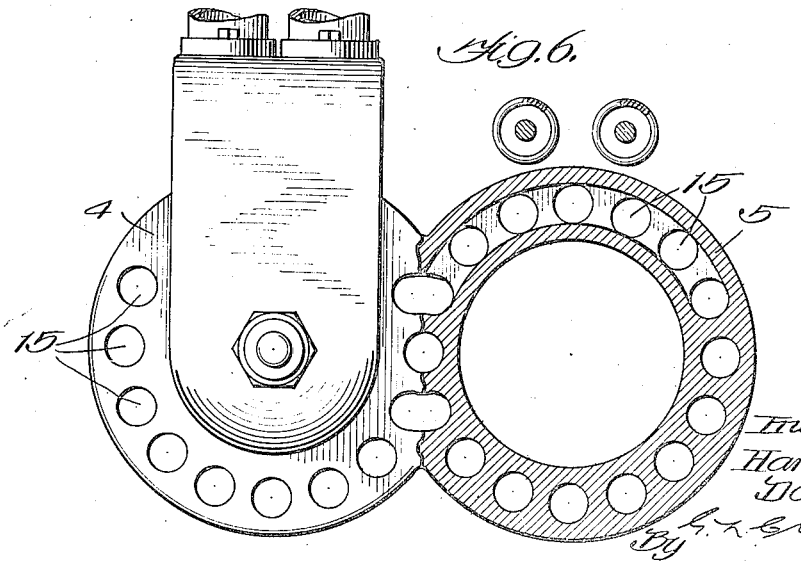

UNITED STATES PATENT OFFICE.

HARRY A. DOUGLAS, OF BRONSON, MICHIGAN.

INTERNAL-COMBUSTION ENGINE.

1,407,519. Specification of Letters Patent. Patented Feb. 21, 1922.

Application filed December 30, 1919. Serial No. 348,414.

*To all whom it may concern:*

Be it known that I, HARRY A. DOUGLAS, citizen of the United States, residing at Bronson, in the county of Branch and State of Michigan, have invented a certain new and useful Improvement in Internal-Combustion Engines, of which the following is a full, clear, concise, and exact description.

My invention relates to internal combustion engines and has for its general object the provision of improved means for cooling the cylinder walls and other portions by means of air which is given forced circulation by engine driven means. It has been the common practice to cool the cylinders and other portions of internal combustion engines by the forced circulation of water around and along heated parts. It has also been proposed to accomplish this result by forcing the circulation of air instead of water through and along the heated parts. The results aimed at have been imperfectly secured by the employment of means expensive in construction and maintenance and inefficient in operation.

In the employment of water for cooling internal combustion engines it is necessary to use a water reservoir and radiating means for cooling the water after it has absorbed heat from engine parts cooled thereby. Such water cooling equipment adds considerable weight to the power plant including a water cooled engine and is accompanied by crowding of the elements of the power plant. In such a water cooled system there is always danger of leakage, the freezing of water and obstruction to the flow of the water with accompanying deterioration of the equipment with consequent expense of maintenance.

Internal combustion engines that are cooled by air avoid many of these difficulties but their efficiency becomes reduced as the size of the power plant increases since the circulating air is capable of a much less rate of cooling, volume for volume, than water.

In carrying out my invention the cylinder of an internal combustion engine is formed with air flues extending from end to end of the engine cylinder or cylinders and preferably disposed in straight lines lengthwise of the cylinders.

The invention is of particular utility in connection with an internal combustion engine of the horizotal type employing a plurality of pairs or sets of cylinders suitably disposed about the engine shaft. In such a structure there is a common crank pit whose walls are provided with air flues communicating with the air flues of the engine cylinders, all of these air flues being excluded from communication with the interior of the crank pit but, as a unit, having places of communication with the external air where air is received into and discharged from the flues. Some engine driven element, such as a fan concentric with the axis of the engine shaft, is employed to effect the forced passage of cooling air through the flues of the cooling system, the pressure impressed upon the cooling air by the fan being sufficient to cause its flow through the various flues and the ultimate discharge of the air. Air which has passed through the air flues is not returned to the engine, or at least is not returned in its highly heated condition, so that very cool air is at all times passing through the flues, the cooling system in this respect being a marked improvement over cooling systems employing water that is used over and over again.

I will explain my invention more fully by reference to the accompanying drawings showing the preferred embodiment thereof and in which Fig. 1 is a sectional view partially in elevation, on line 1—1 of Fig. 2; Fig. 2 is a plan view, partially in section, of the engine illustrated in Fig. 1; and Figs. 3, 4, 5 and 6 are respectively sectional views on lines 3—3, 4—4, 5—5 and 6—6 of Fig. 1.

Like parts are indicated by similar characters of reference throughout the different figures.

The engine illustrated is mounted upon a suitable base, not shown, within the front hooded space of an automobile enclosed by the hood 1 having a lid portion 2 for rendering the engine accessible. This hood is provided with ventilating air passages 3. Four engine cylinders 4, 5, 6 and 7 are contained in the engine shown. The engine cylinders 4 and 6 are axially aligned, the pitmen 8 pertaining to the pistons 9 that work within these cylinders being in driving connection with the engine shaft 10. The engine cylinders 5 and 7 are respectively located abreast of the engine cylinders 4 and 6 and are also axially aligned, the pitmen 11 pertaining to the pistons 12 that work within the cylinders 5 and 7 being also in driving connection with the engine shaft 10, the places of connection of these pitmen with the shaft being one hundred eighty degrees apart from the places of connection of the pitmen 8 with said shaft. The crank case 13 is preferably formed in a casting that is distinct from the engine cylinders, this crank case having air passages or flues 14 extending therethrough along and through the top, bottom and side walls of the crank case, these air passages substantially making a space which surrounds the inner top, bottom and side walls of the crank case. The cylinders 4 and 5 and the formations that provide the cooling flues or passages 15 therefor are desirably made in an integral casting, the same being also true of the cylinders 6 and 7 and the formations providing the air cooling flues for these cylinders, the two sets of cylinders at the opposite ends of the engine cooling flue formations therefor being of similar construction but symmetrical in arrangement. The cooling flues at the engine cylinders are desirably parallel with the axes of these cylinders and extend outwardly as far as the cylinders extend so as to be in cooling relation with all of those portions of the cylinders in which the explosions are initiated and gas expansion occurs. The flues 15 are desirably symmetrical in formation, being produced by coring the casting and such flues are substantially out of communication at the sides there of whereby the metal of the cylinder casting intervenes between adjacent flues. Heat is conducted from the engine cylinders to and by the metal between adjacent flues 15 to be subject to the cooling effect of the air flowing through these flues, cooling effect of the air being thus enhanced as compared with a structure where there is no such formation of flues with metal between adjacent flues.

As is illustrated in Fig. 4, the flues or passages 14 circumscribe the inner walls of the engine cylinders, being annular to secure this result. The flues about adjacent cylinders 4 and 5 (which is also the case with the flues about the engine cylinders 6 and 7) are in circular rows as shown in Fig. 5, the flues that occur between adjacent engine cylinders being common to both of these cylinders. These annular rows are similar in diameter to the diameters of the ends of the flues 14 that surround the engine cylinders so that when the engine cylinders are secured to the crank case by means of the bolts 16, the flues 15 will be brought into register with the flues 14 so as to communicate therewith. By this arrangement there are air conducting passages extending from the outside ends of the cylinders 6 and 7 (the ends at the right of these cylinders as shown in Fig. 2) to the outside ends of the engine cylinders 4 and 5. The crank case flues 14 are closed from communication with the interior of the engine and from communication with the exterior of the engine except at the annular ends of the flues 14 and at the air outlet portion 17 which is preferably annular and surrounds the external portion of the engine shaft with which such annular outlet is coaxial. The portion of the shaft surrounded by the outlet 17 carries a fan 18 which forcibly draws air inwardly through the flues 15 in sufficient volume to cool the engine sufficiently, the air finding exit at the outlet 17.

The invention is not to be limited to the type of engine illustrated whose parts are so well known as to require no description.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:

1. An internal combustion engine including a crank case; engine cylinders between which said crank case is disposed, said engine cylinders having flues for the flow of cooling air extending along these cylinders and formed in the metal thereof, these flues being disposed in annular rows about such cylinders, said crank case having an air passage of annular form at the ends of the crank case, these annular ends of the latter air passage being of diameter similar to the diameter of the rows of flues pertaining to the cylinders with which flues said annular ends of said air passage are in communication; and engine operated means for effecting forced passage of air through the air passages pertaining to the engine cylinders and crank case.

2. An internal combustion engine including a crank case; engine cylinders between which said crank case is disposed, said engine cylinders having flues for the flow of cooling air extending along these cylinders to their outer ends, these flues being formed in the metal thereof, and disposed in annular rows about such cylinders, said crank case having an air passage of annular form at the ends of the crank case, these annular ends of the latter air passage being of a diameter similar to the diameter of the rows of flues pertaining to the cylinders with which flues said annular ends of said air passage are in communication; and engine operated means for effecting forced passage of air through the air passages pertaining to the engine cylinders and crank case.

3. An internal combustion engine including a crank case; engine cylinders between which said crank case is disposed, said engine cylinders having flues for the flow of cooling air extending along these cylinders and formed in the metal thereof, these flues being disposed in annular rows about such cylinders, said crank case having an air passage in communication at its ends with the air flues pertaining to the engine cylinders; and engine operated means for effecting the forced passage of air through the air passages pertaining to the engine cylinders and crank case.

4. An internal combustion engine including a crank case; engine cylinders between which said crank case is disposed, said engine cylinders having flues for the flow of cooling air extending along these cylinders to their outer ends, these flues being formed in the metal thereof and disposed in annular rows about such cylinders, said crank case having an air passage in communication at its ends with the air flues pertaining to the engine cylinder; and engine operated means for effecting the forced passage of air through the air passages pertaining to the engine cylinders and crank case.

5. An internal combustion engine including a crank case; an engine cylinder having flues for the flow of cooling air extending along the cylinder and formed in the metal thereof, these flues being disposed in an annular row about the cylinder, said crank case having an air passage of annular form at an end of the crank case, this annular end of the latter air passage being of diameter similar to the diameter of the row of flues pertaining to the cylinder with which flues said annular end of said air passage is in communication; and engine operated means for effecting forced passage of air through the air passages pertaining to the engine cylinder and crank case.

6. An internal combustion engine including a crank case; an engine cylinder having flues for the flow of cooling air extending along the cylinder, these flues being disposed in an annular row about the cylinder, said crank case having an air passage of annular form at an end of the crank case, this annular end of the latter air passage being of diameter similar to the diameter of the row of flues pertaining to the cylinder with which flues said annular end of said air passage is in communication; and engine operated means for effecting forced passage of air through the air passages pertaining to the engine cylinder and crank case.

In witness whereof, I hereunto subscribe my name this 13th day of December, A. D., 1919.

HARRY A. DOUGLAS.